United States Patent
Taft et al.

(10) Patent No.: US 8,981,837 B1
(45) Date of Patent: Mar. 17, 2015

(54) SYSTEM AND METHOD FOR REDUCTION OF BOTTOM PLATE PARASITIC CAPACITANCE IN CHARGE PUMPS

(71) Applicant: Texas Instruments Deutschland GmbH, Freising (DE)

(72) Inventors: Robert C. Taft, Munich (DE); Vineethraj R. Nair, Freising (DE)

(73) Assignee: Texas Instruments Deutschland GmbH, Freising (DE)

( * ) Notice: Subject to any disclaimer, the term of this patent is extended or adjusted under 35 U.S.C. 154(b) by 0 days.

(21) Appl. No.: 14/020,383

(22) Filed: Sep. 6, 2013

(51) Int. Cl.
  G05F 1/10 (2006.01)
  G05F 3/02 (2006.01)
  H02M 3/07 (2006.01)

(52) U.S. Cl.
  CPC ........................................ *H02M 3/07* (2013.01)
  USPC ....................................................... 327/536

(58) Field of Classification Search
  USPC ....................................................... 327/536
  See application file for complete search history.

(56) References Cited

U.S. PATENT DOCUMENTS

| | | | | |
|---|---|---|---|---|
| 6,486,728 B2* | 11/2002 | Kleveland | ...................... | 327/536 |
| 7,663,427 B2* | 2/2010 | Fujiwara | ...................... | 327/536 |
| 8,487,690 B2* | 7/2013 | Wei et al. | ...................... | 327/536 |
| 8,742,835 B2* | 6/2014 | Lin et al. | ...................... | 327/536 |

\* cited by examiner

*Primary Examiner* — Hai L Nguyen
(74) *Attorney, Agent, or Firm* — Alan A. R. Cooper; Frederick J. Telecky, Jr.

(57) ABSTRACT

A system for providing a load current at a specific output voltage to a circuit block of an integrated circuit (IC) includes a supply node at a supply voltage, a charge pump, and a cross-coupling circuit. The charge pump includes a first a first capacitor to charge while a first clock signal is high and a second capacitor to charge while a second clock signal is high. Each of the capacitors has a top plate node, a bottom plate node, a ground node, and an intermediate node between the bottom plate node and the ground node. The cross-coupling circuit couples the intermediate node of the first capacitor to the supply node while the second clock signal is high and couples the intermediate node of the second capacitor to the supply node while the first clock signal is high.

14 Claims, 6 Drawing Sheets

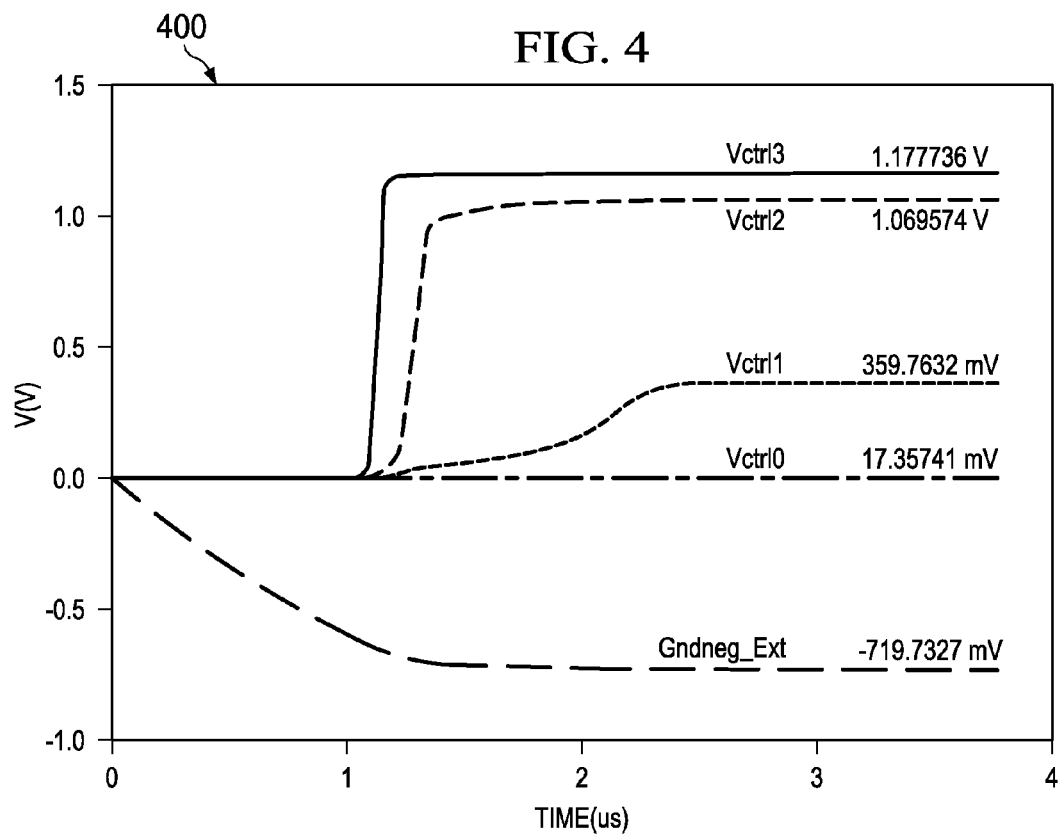
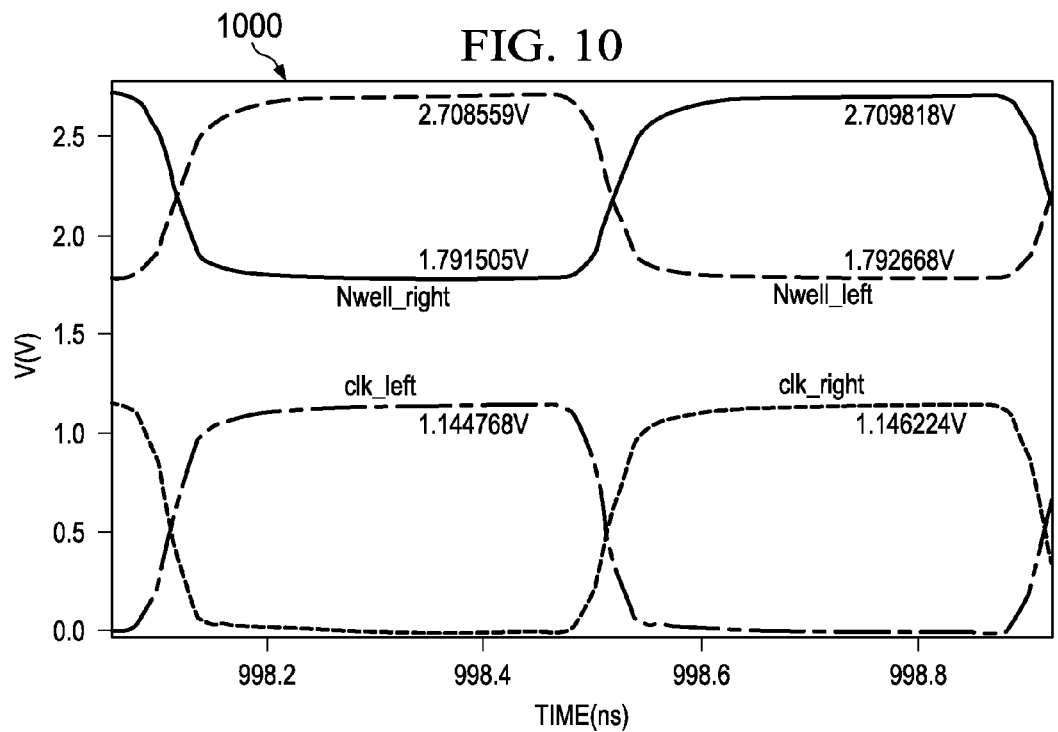

US 8,981,837 B1

SYSTEM AND METHOD FOR REDUCTION OF BOTTOM PLATE PARASITIC CAPACITANCE IN CHARGE PUMPS

CROSS-REFERENCE TO RELATED APPLICATIONS

The present application is related to co-pending U.S. patent application No. 14/020318 entitled "System and Method for Distributed Regulation of Charge Pumps", which is hereby incorporated herein by reference in its entirety.

BACKGROUND

When designing integrated circuits (IC), such as mixed signal ICs, it is often desired to reduce or minimize the number of external power supplies required. However, various specified voltage levels may be required by portions of the IC, to be provided at a certain load current. Charge pumps are commonly used to generate these various voltage levels beyond what is provided by external power supplies, reducing the number of required external power supplies. However, factors such as parasitic capacitance and power dissipation across transistors may reduce charge pump efficiencies, particularly at higher clock frequencies. Thus, any improvement in charge pump efficiency is beneficial.

SUMMARY

The problems noted above are solved in large part by a system for providing a load current at a specific output voltage to a circuit block of an integrated circuit (IC) includes a supply node at a supply voltage, a charge pump, and a cross-coupling circuit. The charge pump includes a first a first capacitor to charge while a first clock signal is high and a second capacitor to charge while a second clock signal is high. Each of the capacitors has a top plate node, a bottom plate node, a ground node, and an intermediate node between the bottom plate node and the ground node. The cross-coupling circuit couples the intermediate node of the first capacitor to the supply node while the second clock signal is high and couples the intermediate node of the second capacitor to the supply node while the first clock signal is high.

Other embodiments of the present disclosure are directed to a method for providing a load current at a specific voltage to a circuit block of an integrated circuit (IC) including providing a supply voltage, charging a first capacitor of a charge pump while a first clock signal is high, and charging a second capacitor of the charge pump while a second clock signal is high. Each of the capacitors has a top plate node, a bottom plate node, a ground node, and an intermediate node between the bottom plate node and the ground node. The method also includes coupling the intermediate node of the first capacitor to the supply voltage while the second clock signal is high and coupling the intermediate node of the second capacitor to the supply voltage while the first clock signal is high.

Still other embodiments of the present disclosure are directed to an integrated circuit (IC) including a circuit block, a supply node at a supply voltage, a charge pump, and a cross-coupling circuit. The charge pump includes a first capacitor to charge while a first clock signal is high and a second capacitor to charge while a second clock signal is high. Each of the capacitors has a top plate node, a bottom plate node, a ground node, and an intermediate node between the bottom plate node and the ground node. The cross-coupling circuit couples the intermediate node of the first capacitor to the supply node while the second clock signal is high and couples the intermediate node of the second capacitor to the supply node while the first clock signal is high.

BRIEF DESCRIPTION OF THE DRAWINGS

For a detailed description of exemplary embodiments of the invention, reference will now be made to the accompanying drawings in which:

FIG. 4 shows a waveform of exemplary control signals in accordance with various embodiments;

FIG. 10 shows a waveform demonstrating an exemplary n-well biasing technique in accordance with various embodiments.

NOTATION AND NOMENCLATURE

Figure 1:
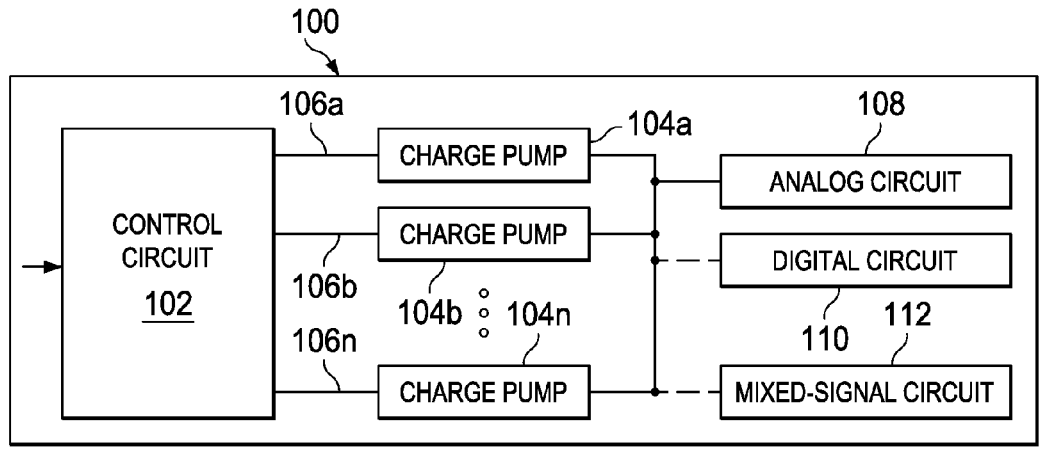
FIG. 1 shows a block diagram of an exemplary integrated circuit (IC) in accordance with various embodiments.

Certain terms are used throughout the following description and claims to refer to particular system components. As one skilled in the art will appreciate, companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . " Also, the term "couple" or "couples" is intended to mean either an indirect or direct electrical connection. Thus, if a first device couples to a second device, that connection may be through a direct electrical connection, or through an indirect electrical connection via other devices and connections.

As used herein, the term "control signal" refers to a signal that causes a component to perform a specified action. A control signal may control one component or many components. Additionally, the term "control signal" may also refer to multiple independent signals, each transmitted to one or more components. For example, a grouping of four analog signals, each analog signal being sent to two of eight components, may be generally referred to as a "control signal."

As used herein, the term "enabled" with respect to a charge pump or other component that generates a voltage and current refers to a mode of operation where the charge pump or component generates a specific voltage at its maximum possible load current delivering strength. For example, where a transistor (e.g., MOSFET) is used as a switch to provide the supply for a clock driver of the charge pump or other component, when the charge pump or other component is "enabled," the transistor is operating in a deep triode region or is "on."

As used herein, the term "partially enabled" with respect to a charge pump or other component that generates a voltage and current refers to a mode of operation where the charge pump or component generates a specific voltage at some fraction of its maximum possible load current. For example, where a MOSFET is used as a switch to provide the supply for a clock driver of the charge pump or other component, when the charge pump or other component is "partially enabled," the transistor is operating in its linear or saturation region or Ohmic mode.

As used herein, the term "disabled" with respect to a charge pump or other component that generates a voltage and current refers to a mode of operation where the charge pump or component is not able to delivery any load current to a load circuit. For example, where a MOSFET is used as a switch to provide the supply for a clock driver of the charge pump or other component, when the charge pump or other component is "disabled," the transistor is operating in a cutoff mode or is "off."

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Designing charge pumps to supply a required load current at a specific load voltage to a circuit block of an integrated circuit (IC) can be a challenging task for IC designs because the ability of a charge pump to supply a particular voltage and current varies according to changes to process/environment parameters (i.e., process corners or operating conditions). Additionally, as will be explained in further detail below, transistors (e.g., MOSFETs) may be used to control the output of a charge pump. However, where the charge pump is partially enabled (i.e., the controlling transistors are operating in their linear region), power consumption increases as a result of current flowing through the controlling transistors in their linear region, resulting in Ohmic losses. Thus, in accordance with various embodiments, a control circuit for charge pumps independently controls at least one of a plurality of charge pumps based on a variation in output voltage due to a variation in an operating condition of an IC, which reduces the amount of power consumption in situations where one or more charge pumps might otherwise be partially enabled.

FIG. 1 shows an integrated circuit (IC) 100 in accordance with various embodiments. The IC 100 includes various circuit blocks such as an analog circuit block 108, a digital circuit block 110, and a mixed-signal circuit block 112. Each circuit block 108, 110, 112 may require a certain voltage and current to be supplied for the block to be functional. Additionally, the required voltage may not correspond to one available from an external power source to the IC 100, and thus a charge pump may be used to provide the required voltage. As such, the IC 100 also includes charge pump 104a and, in some cases, additional charge pumps 104b-104n. For example, a single charge pump may be unable to provide the requisite load current for one of the circuit blocks (or a portion of a circuit block), and thus multiple charge pumps 104a-n are arranged in parallel such that the requisite load current may be supplied at a particular voltage level.

As explained above, variations may occur in process/environment parameters (i.e., process corners or operating condition) such as a variation in a fabrication parameter of the IC 100 (e.g., variations caused by the manufacturing tools and process), a temperature of the IC 100, a supply voltage to the charge pumps 104a-n, or a load of the charge pumps 104a-n (e.g., the load of one of the circuit blocks 108, 110, 112). These variations may affect the ability of the charge pumps 104a-n to deliver a particular load current at a specified voltage.

For example, supply voltages may vary by plus or minus 10% in a "fast" process corner and a "slow" process corner, respectively. In this example, in a "typical" process corner, a supply voltage is 1.2V at a clock frequency of 1.25 GHz. However, in a "fast" process corner, the supply voltage may be 1.32V and in a "slow" process corner the supply voltage may be 1.08V. Thus, as the supply voltage is varied based on operating conditions, more charge pumps may be required to be fully functional in the slow corner to provide the required output voltage at the specified load current. Conversely, fewer charge pumps may be required to be fully functional in the fast corner to provide the same required output voltage at the same specified current.

Figure 2:
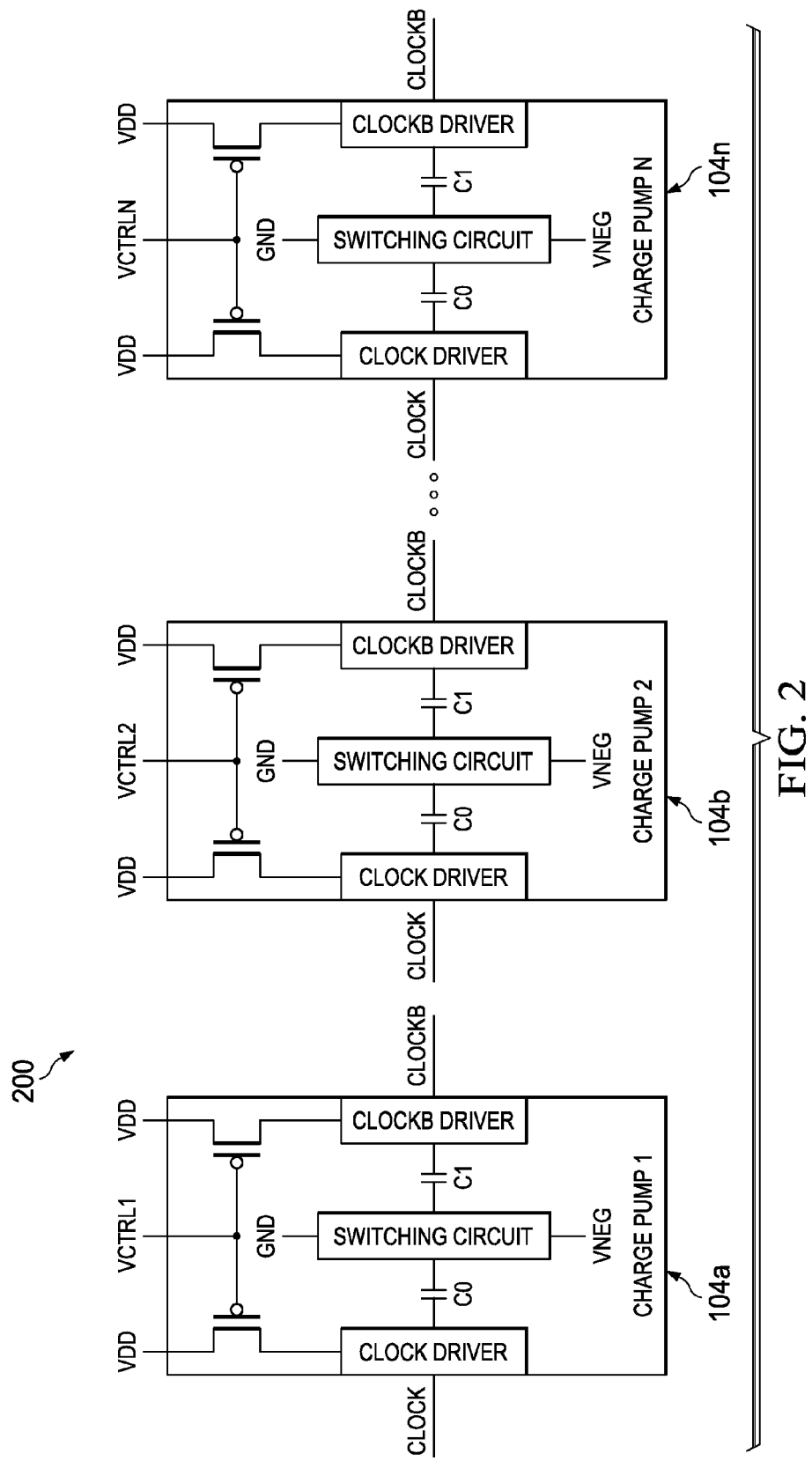
FIG. 2 shows a block diagram of a number of charge pumps in accordance with various embodiments.

Turning now to FIG. 2, a group 200 of charge pumps 104a-n is shown in accordance with various embodiments. The charge pumps 104a-n are shown as negative charge pumps, where Vneg is a negative output voltage. The operation of each charge pump 104a-n is controlled by a control signal labeled Vctrl1, Vctrl2, . . . , Vctrln. The control signals in turn are coupled to gates of PMOS transistors, which control the supply voltage to clock drivers of the charge pump 104a-n. Thus, when the control signals are "low" (or approximately 0V), the PMOS transistors are enabled and the supply voltage is made available to the charge pump 104a-n, enabling the charge pumps 104a-n. Conversely, when the control signals are "high" (e.g., approximately 1.2V), the PMOS transistors are not enabled and the supply voltage is not available to the clock drivers of the charge pumps 104a-n, causing the charge pumps 104a-n to be disabled. Further, in accordance with various embodiments, the control signal comprises an analog control signal, and thus may cause the PMOS transistors to operate in a linear or saturation region, partially enabling the charge pumps 104a-n.

Referring to FIGS. 1 and 2, the IC 100 includes a control circuit 102 that generates the control signals, labeled in FIG. 1 as 106a, 106b, . . . , 106n. In accordance with various embodiments, the control circuit 102 may generate control signals that control at least one of the charge pumps 104a-n independently of others of the charge pumps 104a-n. As a result, the number of control transistors (e.g., the PMOS transistors shown in FIG. 2) operating in the linear or saturation region, and thus consuming power, may be reduced.

By way of a numerical example, assume that one of the circuit blocks 108, 110, 112 requires a specified voltage to be supplied with a load current of 50 mA. There are ten charge pumps 104a-n, and each charge pump is capable of supplying 5 mA of load current in the slow corner, 6 mA of load current in the typical corner, and 7 mA of load current in the fast corner. Thus, if the control circuit 102 determines that the IC 100 is operating in the slow corner (e.g. based on an output voltage of the charge pumps 104a-n), the control circuit 102 generates control signals 106 to enable all ten charge pumps 104 (i.e., to generate 10 * 5 mA=50 mA of load current). However, if the control circuit 102 determines that the IC 100 is operating in the typical corner, the control circuit 102 generates control signals 106 to enable eight charge pumps 104 (i.e., to generate 8 * 6 mA=48 mA of load current), partially enable one charge pump 104 (i.e., to generate 2 mA of load current), and disable one charge pump 104. Similarly, if the control circuit 102 determines that the IC 100 is operating in the fast corner, the control circuit 102 generates control signals 106 to enable seven charge pumps 104 (i.e., to generate 7 * 7 mA=49 mA of load current), partially enable one charge pump 104 (i.e., to generate 1 mA of load current, and disable two charge pumps 104. In this way, the number of charge pumps 104 that are partially enabled in any condition is minimized, thereby reducing power consumption of transistors operating in the linear or saturation region relative to, for example, causing all charge pumps 104 to be partially enabled in the typical and fast corners to generate the required 50 mA of load current by using only one control signal for regulation. Thus, the control circuit 102 generates control signals 106 suitable for varying operating conditions.

Figure 3:
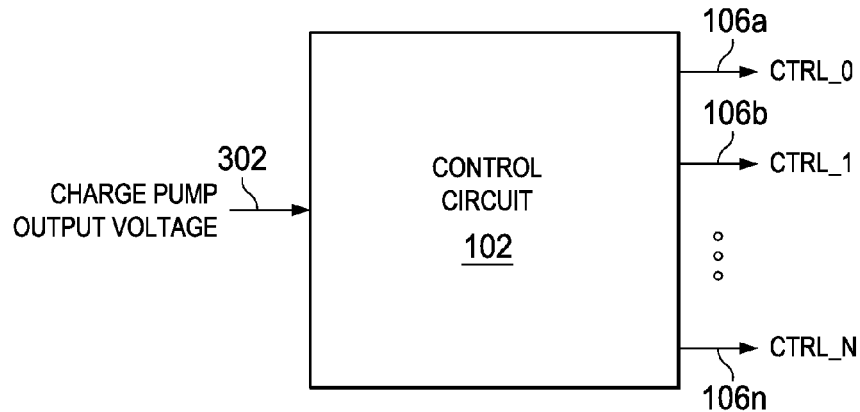
FIG. 3 shows a block diagram of an exemplary control circuit in accordance with various embodiments.

FIG. 3 shows an exemplary control circuit 102 in accordance with various embodiments. The control circuit 102 includes input 302 and generates control signals 106a-n to control the operation of charge pumps 104a-n as explained above. As shown, the control circuit 102 detects an output voltage of the charge pumps 104a-n by way of input 302. In this case, the control circuit 102 is part of a feedback loop with the charge pumps 104a-n (e.g., operates in a "closed-loop" fashion). The output voltage of the charge pumps 104a-n varies with operating conditions of the IC 100 such as temperature, fabrication parameter variations, variations in a supply voltage to the charge pumps 104a-n, and changes in load conditions of the charge pumps 104a-n. Based on these parameters, which affect the load current provided at a specific voltage by charge pumps 104a-n, the control circuit 102 generates control signals 106a-n to enable, partially enable, or disable the various charge pumps 104a-n based on the current needs of circuit blocks 108, 110, 112. In this way, the control circuit 102 maintains the charge pump output at a specific voltage level and required load current irrespective of changes in operating conditions. In other embodiments, the control circuit 102 may receive as input other indications of the operating conditions described above to generate control signals 106a-n to maintain a required load current at a specific voltage for one of or a portion of one of the circuit blocks 108, 110, 112.

FIG. 4 shows an exemplary waveform 400 including four control signals and the voltage generated by negative charge pumps 104a-n, which may be arranged in parallel to provide a required load current to one of the circuit blocks 108, 110, 112. In this case, the control circuit 102 has determined that at least some charge pumps 104a-n may be disabled (i.e., Vctrl2 and Vctrl3 cause PMOS control transistors to be off), that some charge pumps 104a-n may be partially enabled (i.e., Vctrl1 causes PMOS control transistors to operate in the linear region), and that some charge pumps 104a-n may be enabled (i.e., Vctrl0 causes PMOS control transistors to be on). In some embodiments, one control signal 106 may be generated for each charge pump while in other embodiments one control signal 106 may be generated to control more than one charge pump 104. As explained above, as long as some charge pumps 104 may be controlled independently of other charge pumps 104, power consumption may be reduced by reducing or minimizing the number of charge pumps 104 that are partially enabled in any particular operating condition.

Figure 5:
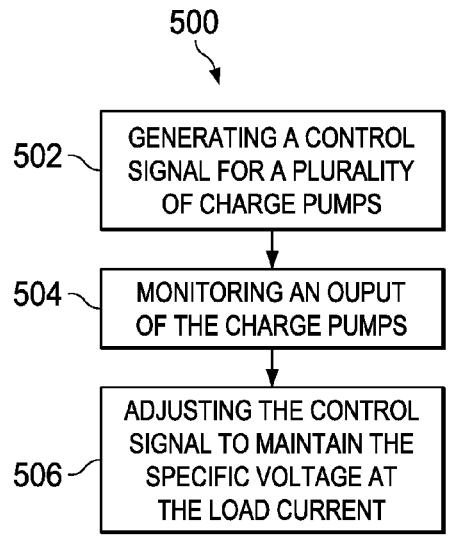
FIG. 5 shows a flow chart of a method in accordance with various embodiments.

FIG. 5 shows a method 500 for providing a load current at a specific voltage to one of the circuit blocks 108, 110, 112 of the IC 100 in accordance with various embodiments. The method 500 begins in block 502 with generating a control signal for a plurality of charge pumps. As explained above, one charge pump 104 is not capable of providing the entire load current required by the circuit block 108, 110, 112, and thus each charge pump 104 provides at most a fraction of the load current and multiple charge pumps 104 are arranged in parallel to provide the load current. Further, as explained above, the control signal causes each of the charge pumps to be either enabled, partially enabled, or disabled, based on an operating condition of the IC 100 or the charge pumps 104 themselves. In order to reduce power consumption, in particular of the PMOS transistors that control the charge pumps 104, at least one of the charge pumps 104 is controlled independently of the other charge pumps 104. This allows for the reduction or minimization of the number of charge pumps 104 that are partially enabled in any particular operating scenario. The method continues in block 504 with monitoring an output (e.g., an output voltage or output current) of the charge pumps 104 and in block 506 with adjusting the control signal to maintain the specific voltage at the required load current.

The above-described techniques for controlling a plurality of charge pumps allow for an improvement in overall efficiency of a charge pump system (e.g., the relationship between current drawn and current delivered to a load) relative to a scheme in which all charge pumps are commonly regulated, or where no charge pump is able to be controlled independently of the other charge pumps.

Additionally, parasitic bottom plate capacitance associated with various capacitors present in the charge pumps also reduces the efficiency of a charge pump system. As will be explained in further detail below, the parasitic bottom plate capacitance reduces efficiency because the clock or switching signal applied to the charge pump must also drive this capacitance in addition to the actual capacitors utilized in the charge pump.

Figure 6:
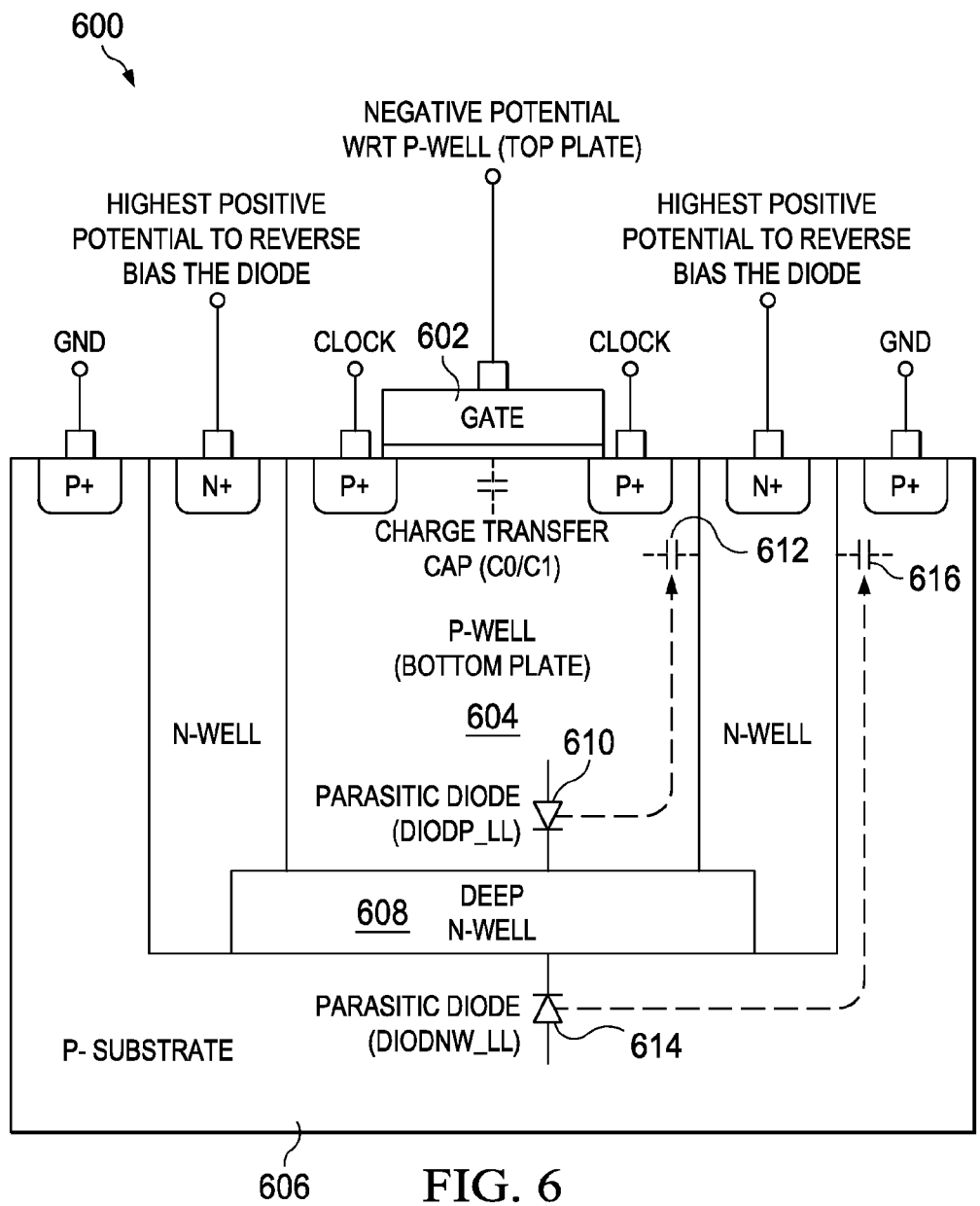
FIG. 6 shows a cross-sectional view of an exemplary capacitor in accordance with various embodiments.

FIG. 6 shows a cross-sectional schematic 600 of a MOS device (generally, a transistor) that may be utilized as a capacitor in a charge pump, as would generally be known by those of ordinary skill in the art. The capacitor shown in schematic 600 includes a top plate node 602, which is the gate of the transistor; a bottom plate node 604, which is the source and the drain of the MOS device; a ground node 606, which is the P-substrate of the MOS device; and an intermediate node 608, which is the isolating N-well of the MOS device. A diode 610 is formed at the junction between the p-well bottom plate 604 and the isolating n-well 608, which is modeled as an equivalent parasitic capacitor 612. Similarly, a diode 614 is formed at the junction between the isolating n-well 608 and the p-substrate 606, which is modeled as an equivalent parasitic capacitor 616. As will be explained in further detail below, a clock that drives a charge pump must also drive at least one of the parasitic capacitors 612, 616 of the bottom plate 604, reducing the efficiency of the charge pump.

Figure 7:
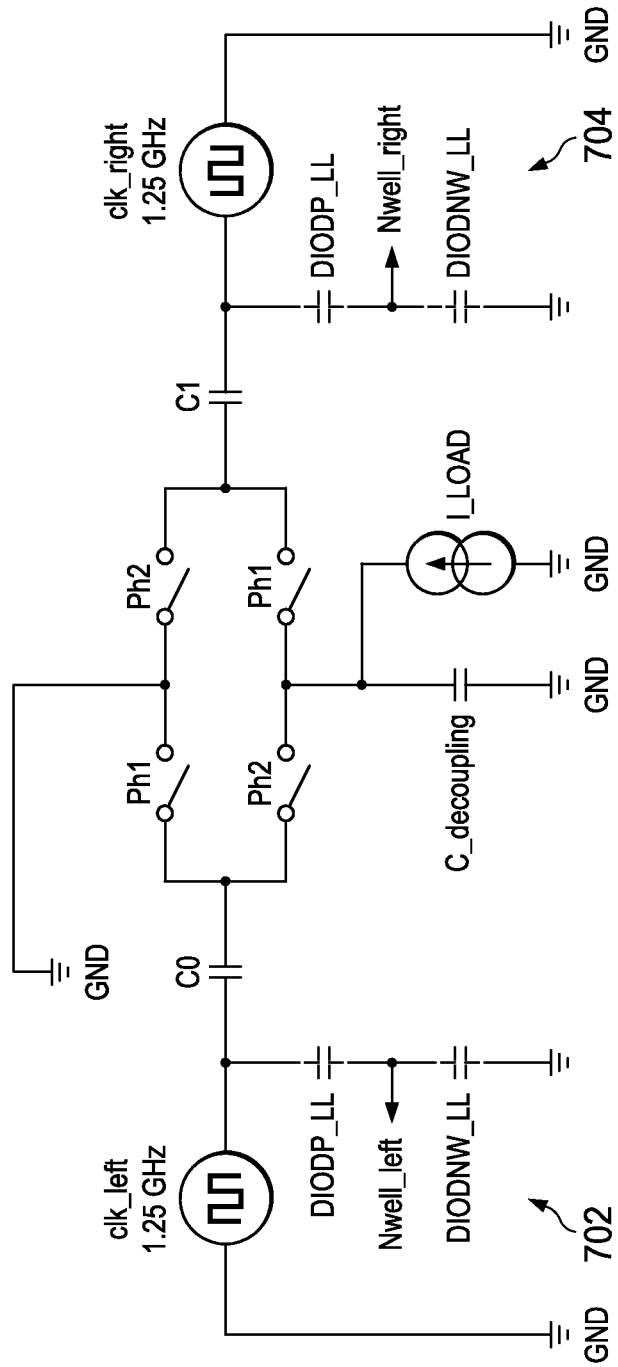
FIG. 7 shows a schematic of an exemplary charge pump including a model of parasitic bottom plate capacitance in accordance with various embodiments.

FIG. 7 shows an exemplary schematic 700 of a charge pump 104 in accordance with various embodiments. The schematic 700 shows the charge pump with the above-explained parasitic bottom plate capacitance modeled, as shown by the portions 702, 704 of the schematic. The portions 702, 704 correspond to the modeled capacitors formed between the bottom plate node and the ground node 606 explained above with respect to FIG. 6. As can be seen, when the clock labeled as clk_left is driving capacitor C0, it must also drive the parasitic capacitance 702 formed at the bottom plate of C0 as shown in FIG. 6. Similarly, when the clock labeled as clk_right is driving capacitor C1, it must also drive the parasitic capacitance 704 formed at the bottom plate of C1 as shown in FIG. 6. Requiring clk_left and clk_right to drive additional parasitic capacitance 702, 704 reduces the efficiency of the charge pump 700; this efficiency is further reduced as the frequency of the clocks increases. A reduction in the parasitic bottom plate capacitance in a charge pump results in an increase in the efficiency of the charge pump, which is increasingly important as the clock frequency increases, and is thus beneficial.

Figure 8:
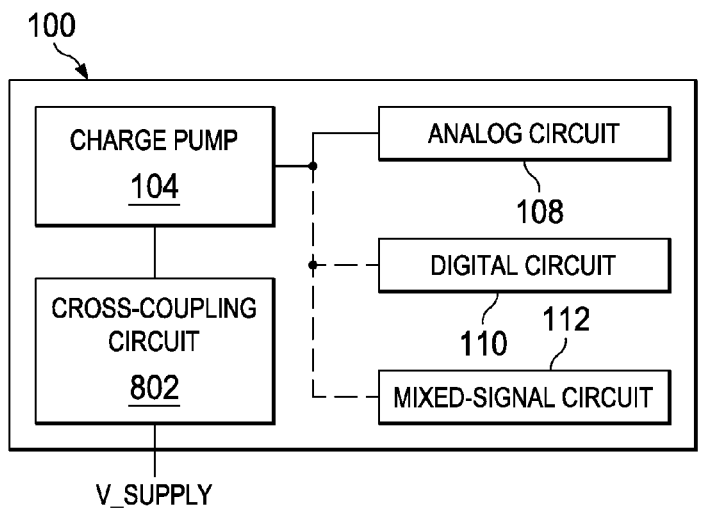
FIG. 8 shows a block diagram of another exemplary IC in accordance with various embodiments.

FIG. 8 shows another embodiment of IC 100 in accordance with various embodiments. Similar to FIG. 1, a charge pump 104 to provide a load current at a specified voltage to one of the circuit blocks 108, 110, 112. As above, in some cases, additional charge pumps may be needed to provide the requisite load current for one of the circuit blocks, and thus multiple charge pumps are arranged in parallel such that the requisite load current may be supplied at a particular voltage level. Additionally, in accordance with various embodiments, a cross-coupling circuit 802 is coupled to the charge pump 104 to reduce the parasitic bottom plate capacitance of the charge pump 104. As will be explained in further detail below, the cross-coupling circuit 802 increases the reverse bias of the diodes 610, 614 described above in FIG. 6, which reduces the parasitic capacitance 612, 616 created by these diodes.

Figure 9:
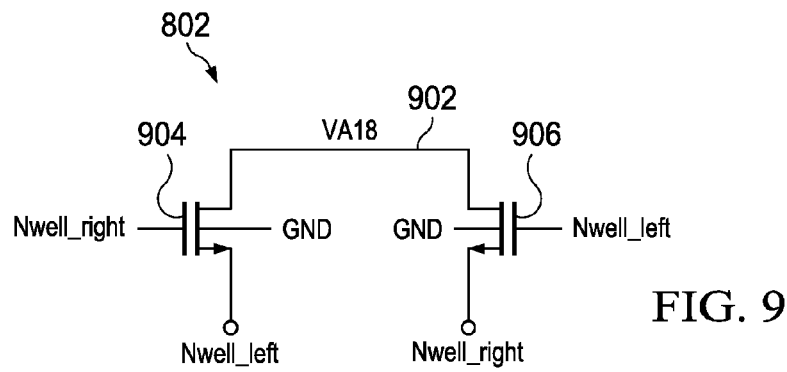
FIG. 9 shows a schematic of an exemplary cross-coupled circuit in accordance with various embodiments.

FIG. 9 shows the cross-coupling circuit 802 in further detail. The cross-coupling circuit 802 couples a node 902 at a supply voltage (e.g., a 1.8V DC voltage) to the isolating n-well 608 of the capacitors in the charge pump shown in schematic 700. In particular, a switch 904 couples the node 902 to the isolating n-well 608 of capacitor C0 in FIG. 7 and switch 906 couples the node 902 to the isolating n-well 608 of capacitor C1 in FIG. 7. As shown, the switches 904, 906 comprise NMOS transistors. In particular, the gate of the transistor 904 that couples the node 902 to the isolating n-well 608 of capacitor C0 is driven by the isolating n-well 608 of capacitor C1. Conversely, the gate of the transistor 906 that couples the node 902 to the isolating n-well 608 of capacitor C1 is driven by the isolating n-well 608 of capacitor C0.

In this way, when C0 is being driven by clk_left, the isolating n-well 608 of capacitor C1 is coupled to node 902 and thus is maintained at the supply voltage.

Similarly, when C1 is being driven by clk_right, the isolating n-well 608 of capacitor C0 is coupled to node 902 and thus is maintained at the supply voltage. As a result, each isolating n-well 608 is biased to the supply voltage when its associated capacitor is not being driven by a clock. Further, when the associated capacitor is driven by a clock, each isolating n-well 608 is driven to a higher voltage compared to a situation where, for example, the N-well is tied to the supply voltage, resulting in a larger reverse bias between the isolating n-well 608 and each of the p-well bottom plate 604 and the p-substrate 606. Increasing the reverse bias of a junction diode is analogous to increasing the distance between plates of a capacitor, which reduces capacitance, and thus the parasitic capacitance of the bottom plate 604 is reduced. The cross-coupling circuit 802 described above is exemplary, and one skilled in the art will appreciate that other similar circuits to provide additional reverse bias to the capacitors of a charge pump are within the scope of this disclosure.

FIG. 10 shows an exemplary waveform 1000 of voltage as a function of time for each of the isolating n-wells 608 (labeled Nwell_left and Nwell_right) and each of the clock signals (clk_left and clk_right). As can be seen, when Nwell_right is not being driven (i.e., clk_right is low), Nwell_right is maintained at approximately 1.8V. Similarly, when Nwell_left is not being driven (i.e., clk_left is low), Nwell_left is maintained at approximately 1.8V. As a result, when either isolating n-well 608 is driven by a clock signal, the voltage of the isolating n-well 608 is driven from 1.8V to a higher voltage based on the amplitude of the clock signal. As explained above, this reduces the reverse bias junction capacitance of each capacitor C0 and C1 in the charge pump 104. By reducing the parasitic capacitance of the capacitors C0 and C1, the efficiency of the charge pump 104 is increased. Additionally, only two additional devices (i.e., NMOS transistors 904, 906) are required to implement this n-well biasing technique.

Figure 11:
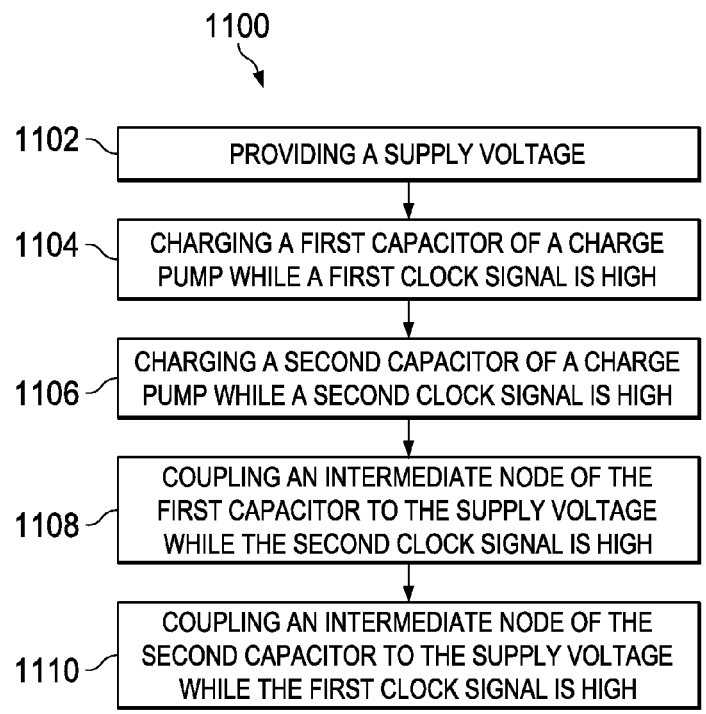
FIG. 11 shows a flow chart of another method in accordance with various embodiments.

FIG. 11 shows a method 1100 for providing a load current at a specific voltage to one of the circuit blocks 108, 110, 112 of the IC 100 in accordance with various embodiments. The method 1100 begins in block 1102 with providing a supply voltage. In some cases the supply voltage may be a DC voltage of about 1.8V. The method 1100 continues in block 1104 with charging a first capacitor of a charge pump while a first clock signal is high and then in block 1106 with charging a second capacitor of the charge pump while a second clock signal is high. In some embodiments, the first and second clock signals are phase shifted by about 180 degrees. As shown in FIG. 6, each of the capacitors may comprise a MOS device. The capacitors include a top plate node, which is the gate of the MOS device; a bottom plate node, which is the source and the drain of the MOS device; a ground node, which is the P-substrate of the MOS device; and an intermediate node, which is the isolating N-well of the MOS device. The method 1100 continues in block 1108 with coupling the intermediate node of the first capacitor to the supply node while the second clock signal is high and in block 1110 with coupling the intermediate node of the second capacitor to the supply node while the first clock signal is high. By coupling the intermediate nodes of the capacitors to the supply voltage in this manner, the intermediate nodes are biased to a higher voltage when driven by a clock signal. As explained above, this reduces the reverse bias junction capacitance of each capacitor in a charge pump. By reducing the parasitic capacitance of the capacitors, the efficiency of the charge pump is increased. Further, such an improvement in efficiency is seen with relatively little additional required hardware; in particular, only two additional devices (i.e., NMOS transistors 904, 906) are required to implement this biasing technique.

One skilled in the art will appreciate that the above-described techniques for improving the efficiency of charge pump systems may be applied independently or in conjunction with each other. That is, either technique may be implemented by itself to improve the efficiency of a charge pump system or both techniques may be used together to improve the efficiency of a charge pump system. All such combinations are within the scope of the present disclosure.

The above discussion is meant to be illustrative of the principles and various embodiments of the present invention. Numerous variations and modifications will become apparent to those skilled in the art once the above disclosure is fully appreciated. For example, although generally described with reference to MOSFET-type transistors in particular, it is contemplated that other transistors (e.g., bipolar junction transistors) or similar circuit elements could be used to implement the above-described systems and methods. It is intended that the following claims be interpreted to embrace all such variations and modifications.

What is claimed is:

1. A system for providing a load current at a specific output voltage to a circuit block of an integrated circuit (IC), comprising:
   a supply node at a supply voltage;
   a charge pump, comprising:
      a first capacitor to charge while a first clock signal is high; and
      a second capacitor to charge while a second clock signal is high, each of the capacitors having a top plate node, a bottom plate node, a ground node, and an intermediate node between the bottom plate node and the ground node; and
a cross-coupling circuit to:
couple the intermediate node of the first capacitor to the supply node while the second clock signal is high; and
couple the intermediate node of the second capacitor to the supply node while the first clock signal is high,
wherein, for each capacitor, the top plate node comprises a gate of a MOS device, the bottom plate node comprises a source and a drain of the MOS device, the ground node comprises a P-substrate of the MOS device, and the intermediate node comprises an isolating N-well of the MOS device and wherein the cross-coupling circuit comprises:
a first switch controlled by an isolating N-well voltage of the second capacitor that couples the isolating N-well of the first capacitor to the supply node; and
a second switch controlled by an isolating N-well voltage of the first capacitor that couples the isolating N-well of the second capacitor to the supply node.

2. The system of claim 1 wherein:
each switch comprises an NMOS transistor;
the isolating N-well voltage of the second capacitor is coupled to a gate of the first switch; and
the isolating N-well voltage of the first capacitor is coupled to a gate of the second switch.

3. The system of claim 1 wherein:
a reverse-bias voltage between the intermediate node and the ground node of the first capacitor is greater than the supply voltage or an amplitude of the first clock signal; and
a reverse-bias voltage between the intermediate node and the ground node of the second capacitor is greater than the supply voltage or an amplitude of the second clock signal.

4. The system of claim 1 further comprising:
at least one other charge pump; and
a control circuit to generate a control signal for each of the charge pumps;
wherein the control signal causes each of the charge pumps to be enabled, partially enabled, or disabled; and
wherein the control signal controls one of the charge pumps independently of the other charge pump.

5. The system of claim 1 wherein a phase of the first clock signal is shifted 180 degrees relative to a phase of the second clock signal.

6. A method for providing a load current at a specific voltage to a circuit block of an integrated circuit (IC), comprising:
providing a supply voltage;
charging a first capacitor of a charge pump while a first clock signal is high;
charging a second capacitor of the charge pump while a second clock signal is high, wherein each of the capacitors comprises a top plate node, a bottom plate node, a ground node, and an intermediate node between the bottom plate node and the ground node, the method further comprising:
coupling the intermediate node of the first capacitor to the supply voltage while the second clock signal is high; and
coupling the intermediate node of the second capacitor to the supply voltage while the first clock signal is high,
wherein, for each capacitor, the top plate node comprises a gate of a MOS device, the bottom plate node comprises a source and a drain of the MOS device, the ground node comprises a P-substrate of the MOS device, and the intermediate node comprises an isolating N-well of the MOS device and wherein coupling further comprises:
coupling the isolating N-well of the first capacitor to the supply voltage by a first switch operated by an isolating N-well voltage of the second capacitor; and
coupling the isolating N-well of the second capacitor to the supply voltage by a second switch operated by an isolating N-well voltage of the first capacitor.

7. The method of claim 6 wherein each switch comprises an NMOS transistor and the method further comprises:
coupling an isolating N-well voltage of the second capacitor to a gate of the first switch; and
coupling an isolating N-well voltage of the first capacitor to a gate of the second switch.

8. The method of claim 6 wherein:
a reverse-bias voltage between the intermediate node and the ground node of the first capacitor is greater than the supply voltage or an amplitude of the first clock signal; and
a reverse-bias voltage between the intermediate node and the ground node of the second capacitor is greater than the supply voltage or an amplitude of the second clock signal.

9. The method of claim 6 further comprising:
generating a control signal for the charge pump and another charge pump;
wherein the control signal causes each of the charge pumps to be enabled, partially enabled, or disabled; and
wherein the control signal controls one of the charge pumps independently of the other charge pump.

10. The method of claim 6 wherein a phase of the first clock signal is shifted 180 degrees relative to a phase of the second clock signal.

11. An integrated circuit (IC), comprising:
a circuit block;
a supply node at a supply voltage;
a charge pump, comprising:
a first capacitor to charge while a first clock signal is high; and
a second capacitor to charge while a second clock signal is high, each of the capacitors having a top plate node, a bottom plate node, a ground node, and an intermediate node between the bottom plate node and the ground node; and
a cross-coupling circuit to:
couple the intermediate node of the first capacitor to the supply node while the second clock signal is high; and
couple the intermediate node of the second capacitor to the supply node while the first clock signal is high, and
a reverse-bias voltage between the intermediate node and the ground node of the first capacitor is greater than the supply voltage or an amplitude of the first clock signal; and
a reverse-bias voltage between the intermediate node and the ground node of the second capacitor is greater than the supply voltage or an amplitude of the second clock signal.

12. The IC of claim 11 wherein, for each capacitor, the top plate node comprises a gate of a MOS device, the bottom plate node comprises a source and a drain of the MOS device, the ground node comprises a P-substrate of the MOS device, and the intermediate node comprises an isolating N-well of the MOS device and wherein the cross-coupling circuit comprises:

a first switch controlled by an isolating N-well voltage of the second capacitor that couples the isolating N-well of the first capacitor to the supply node; and a second switch controlled by an isolating N-well voltage of the first capacitor that couples the isolating N-well of the second capacitor to the supply node.

13. The IC of claim 12 wherein:

each switch comprises an NMOS transistor;

the isolating N-well voltage of the second capacitor is coupled to a gate of the first switch; and the isolating N-well voltage of the first capacitor is coupled to a gate of the second switch.

14. The IC of claim 11 further comprising:

at least one other charge pump; and a control circuit to generate a control signal for each of the charge pumps;

wherein the control signal causes each of the charge pumps to be enabled, partially enabled, or disabled; and wherein the control signal controls one of the charge pumps independently of the other charge pump.

* * * * *